United States Patent
Meyers et al.

(10) Patent No.: US 11,512,646 B2
(45) Date of Patent: Nov. 29, 2022

(54) AIR STARTER WITH BEARING COOLING

(71) Applicant: Unison Industries, LLC, Jacksonville, FL (US)

(72) Inventors: Shiloh Montegomery Meyers, Miamisburg, OH (US); Subrata Nayak, Bangalore (IN); Pradeep Hemant Sangli, Bangalore (IN); David Allan Dranschak, Englewood, OH (US); Santosh Kumar Prasad, Bangalore (IN); Marc David Zinger, Dayton, OH (US); Sharad Pundlik Patil, Bangalore (IN); Harsha Sanjeewa Bulathsinghalage, Miamisburg, OH (US); Sumathi P, Bangalore (IN)

(73) Assignee: Unison Industries, LLC, Jacksonville, FL (US)

(*) Notice: Subject to any disclaimer, the term of this patent is extended or adjusted under 35 U.S.C. 154(b) by 307 days.

(21) Appl. No.: 16/724,594

(22) Filed: Dec. 23, 2019

(65) Prior Publication Data
US 2021/0189967 A1    Jun. 24, 2021

(51) Int. Cl.
*F02C 7/00*     (2006.01)
*F02C 7/277*    (2006.01)
*F01D 25/12*    (2006.01)

(52) U.S. Cl.
CPC ............ *F02C 7/277* (2013.01); *F01D 25/125* (2013.01); *F05D 2260/85* (2013.01)

(58) Field of Classification Search
CPC .............................. F02C 7/277; F01D 25/125
See application file for complete search history.

(56) References Cited

U.S. PATENT DOCUMENTS

| | | | |
|---|---|---|---|
| 1,698,514 A | 1/1929 | Schmidt | |
| 2,709,567 A * | 5/1955 | Wood | F01D 25/125 |
| | | | 384/316 |
| 3,286,461 A | 11/1966 | Johnson | |
| 3,565,543 A | 2/1971 | Mrazek | |
| 3,602,602 A | 8/1971 | Salvatore | |
| 3,907,457 A * | 9/1975 | Nakamura | F01D 11/02 |
| | | | 277/420 |
| 4,830,571 A | 5/1989 | Coons | |
| 6,318,958 B1 | 11/2001 | Giesler et al. | |
| 6,623,238 B2 | 9/2003 | Langston et al. | |
| 6,702,873 B2 | 3/2004 | Hartman | |
| 6,814,539 B2 | 11/2004 | Farnsworth et al. | |
| 6,892,455 B1 | 5/2005 | Feest | |
| 7,596,938 B2 | 10/2009 | Bart et al. | |
| 8,876,476 B2 | 11/2014 | Blewett et al. | |
| 10,138,812 B2 | 11/2018 | Heaton et al. | |
| 10,316,756 B2 | 6/2019 | Gentile et al. | |
| 10,495,182 B2 | 12/2019 | Nayak et al. | |
| 2013/0101402 A1 | 4/2013 | Rosen et al. | |
| 2015/0345320 A1 | 12/2015 | Webb | |
| 2016/0341070 A1 | 11/2016 | Garcia et al. | |
| 2019/0032564 A1 | 1/2019 | Martinez et al. | |
| 2019/0101057 A1 | 4/2019 | Stevenson et al. | |

* cited by examiner

*Primary Examiner* — Katheryn A Malatek
(74) *Attorney, Agent, or Firm* — McGarry Bair PC (57) ABSTRACT

An air starter for starting a turbine engine that includes a housing, a turbine, an output shaft, and at least one bearing. The housing can define an interior where the turbine couples to the output shaft. A primary air flow path extends through the housing where air from the turbine can be exhausted through a primary outlet or a cooling outlet.

20 Claims, 5 Drawing Sheets

AIR STARTER WITH BEARING COOLING

TECHNICAL FIELD

The disclosure generally relates to a structure and method for cooling a bearing assembly in an air starter for a turbine engine, specifically cooling a bearing assembly in the air starter using diverted air from the air starter.

BACKGROUND

A turbine engine, for example a gas turbine engine, is engaged in regular operation to an air starter. Air starters are typically removably coupled to the engine through a gearbox or other transmission assembly when it is desired to start the turbine engine. The transmission transfers power from the air starter to the engine to assist in starting the engine. The internal components of both the turbine engine and the air starter spin together such that the air starter can be used to start the engine.

Air starters for turbine engines run for a limited amount of time. If the turbine engine does not start within the limited run time of the air starter, the air starter must go through a cool-down process before a second attempt at starting the turbine engine can take place. The amount of time an air starter can run is often controlled by the temperature of internal rotating components, such as one or more bearings in a bearing assembly.

BRIEF DESCRIPTION

In one aspect, the disclosure relates to an air starter that includes a housing defining an interior having a primary inlet and a primary outlet to define a primary air flow path from the primary inlet to the primary outlet, a turbine located within the interior, an output shaft coupled to the turbine, at least one bearing located in the housing and rotationally supporting the output shaft, and a cooling passage adjacent the at least one bearing and having a cooling inlet and a cooling outlet, to define cooling air flow path from the cooling inlet to the cooling outlet, with the cooling inlet fluidly coupled to the primary air flow path whereby a portion of air in the primary air flow path passes through the cooling passage and cools the bearing.

In another aspect, the disclosure relates to an air starter that includes a housing having a peripheral wall defining an interior, the housing having a primary inlet and a primary outlet to define a primary air flow path from the primary inlet to the primary outlet, with the primary outlet comprising a plurality of openings circumferentially arranged in the peripheral wall, a retention member located within the interior and mounted to the housing in axial alignment with the primary outlet, the retention member having an axial face forming a portion of the primary air flow path and having a bearing housing on a downstream side of the axial face, at least two axially-spaced bearings mounted within the bearing housing, an output shaft rotationally supported in the at least two axially-spaced bearings and having a portion upstream of the retention member, a turbine mounted to the portion of the output shaft upstream of the retention member, and a cooling passage extending through the retention member along the bearing housing and having a cooling inlet on the axial face of the retention member and a cooling outlet separate from the primary outlet.

In yet another aspect, the disclosure relates to a method of cooling a bearing assembly in an air starter having a primary air flow path flowing over a turbine rotationally supported by a bearing assembly, the method comprising diverting a portion of air from the primary air flow path to flow over the bearing assembly.

DETAILED DESCRIPTION

Aspects of the disclosure described herein are directed to a turbine engine with an air starter that includes a retaining member with at least one cooling passage for cooling at least one bearing assembly of the air starter. For purposes of illustration, the present disclosure will be described with respect to an air starter for an aircraft turbine engine. For example, the disclosure can have applicability in other vehicles or engines, and can be used to provide benefits in industrial, commercial, and residential applications. Further non-limiting examples of other vehicles or engines to which the disclosure can relate can include boats, cars, or other aquatic or land vehicles. Industrial, commercial, or residential applications of the disclosure can include, but are not limited to, marine power plants, wind turbines, small power plants, or helicopters.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
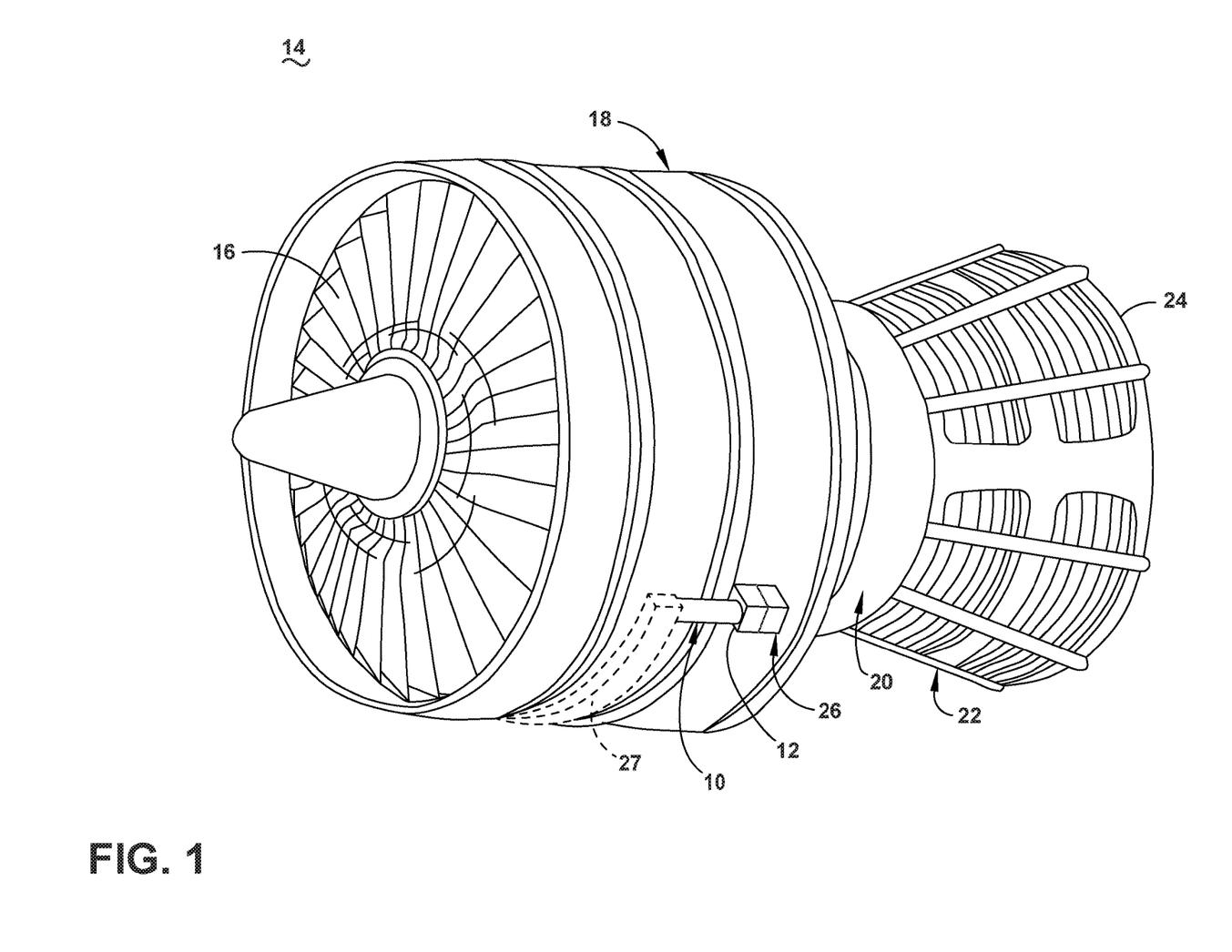
FIG. 1 is a schematic illustration of a turbine engine with an air starter.

Referring to FIG. 1, a starter motor or air starter 10 is coupled to an accessory gear box (AGB) 12, also known as a transmission housing, and together are schematically illustrated as being mounted to a turbine engine 14 such as a gas turbine engine. The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of the shaft to power the fan 16.

The turbine engine can be a turbofan engine, such as a General Electric GEnx or CF6 series engine, commonly used in modern commercial and military aviation or it could be a variety of other known turbine engines such as a turboprop or turboshaft.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft for example but not limited to fuel pumps, electrical systems, and cabin environment controls. The air starter 10 can be mounted on the outside of either the air intake region containing the fan 16 or on the core near the high pressure compression region 18.

Optionally, an air intake conduit 27 can couple to the air starter 10. The air intake conduit 27 can supply the air starter 10 with pressurized air.

Figure 2:
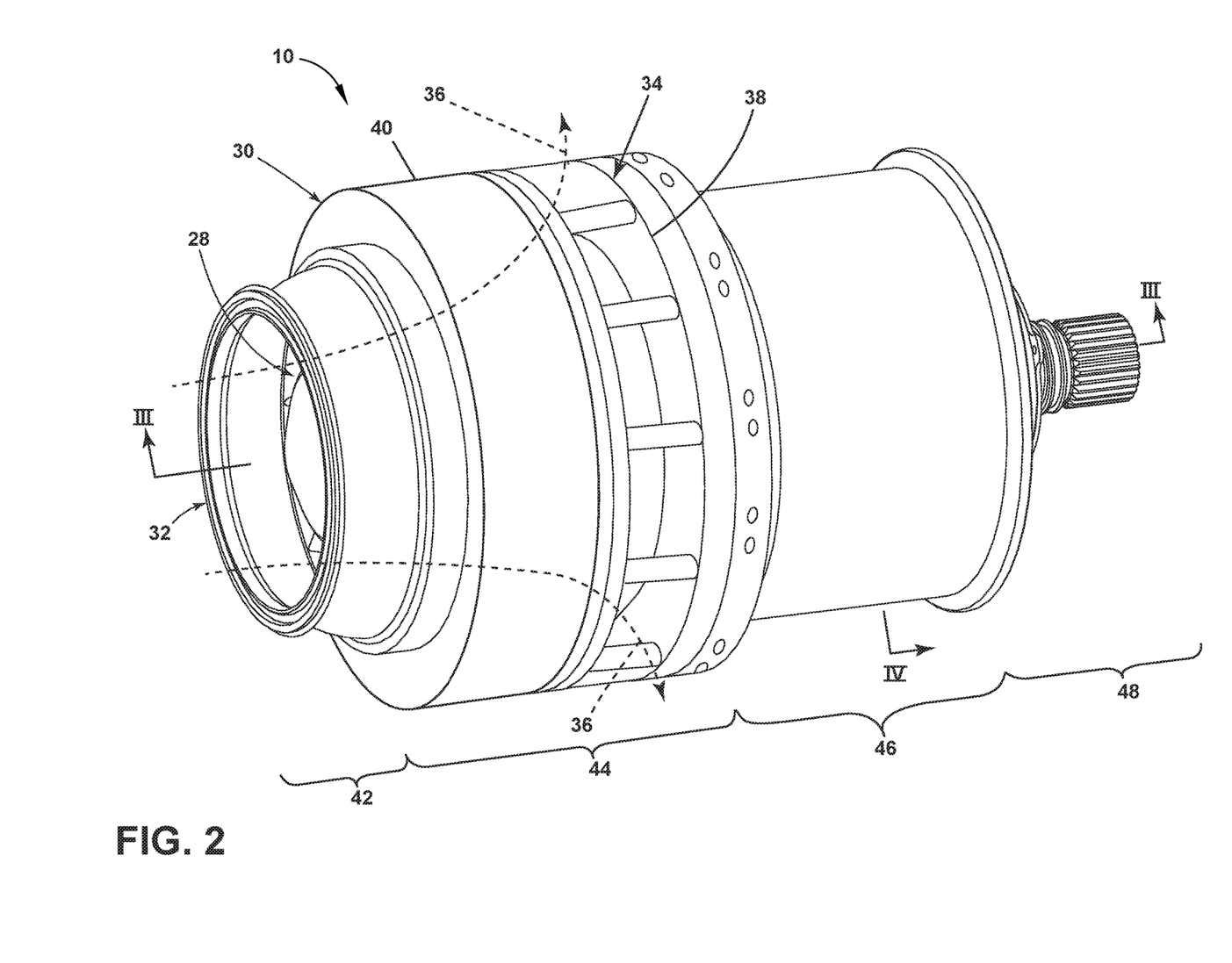
FIG. 2 further illustrates the air starter of FIG. 1.

Referring now to FIG. 2, an example of an air starter 10 is shown. Generally, the air starter 10 includes a housing 30 defining an interior 28 having a primary inlet 32 and a primary outlet 34. A primary air flow path 36, illustrated schematically with an arrow, extends between the primary inlet 32 and the primary outlet 34 for communicating a flow of fluid, including, but not limited to gas, compressed air, or the like, there through. The primary outlet 34 can include a plurality of circumferentially arranged openings 38 in a peripheral wall 40 of the housing 30. In this configuration, the primary inlet 32 is an axial inlet and the primary outlet 34 is a radial or circumferential outlet alone the periphery of the housing 30.

The housing 30 can be made up of two or more parts that are combined together or can be integrally formed as a single piece. In the depicted aspects of the disclosure, the housing 30 of the air starter 10 generally defines, in an axial series arrangement, an inlet assembly 42, a turbine section 44, a gear box 46, and a drive section 48. The air starter 10 can be formed by any materials and methods, including, but not limited to, additive manufacturing or die-casting of high strength and lightweight metals such as aluminum, stainless steel, iron, or titanium. The housing 30 and the gear box 46 can be formed with a thickness sufficient to provide adequate mechanical rigidity without adding unnecessary weight to the air starter 10 and, therefore, the aircraft.

Figure 3:
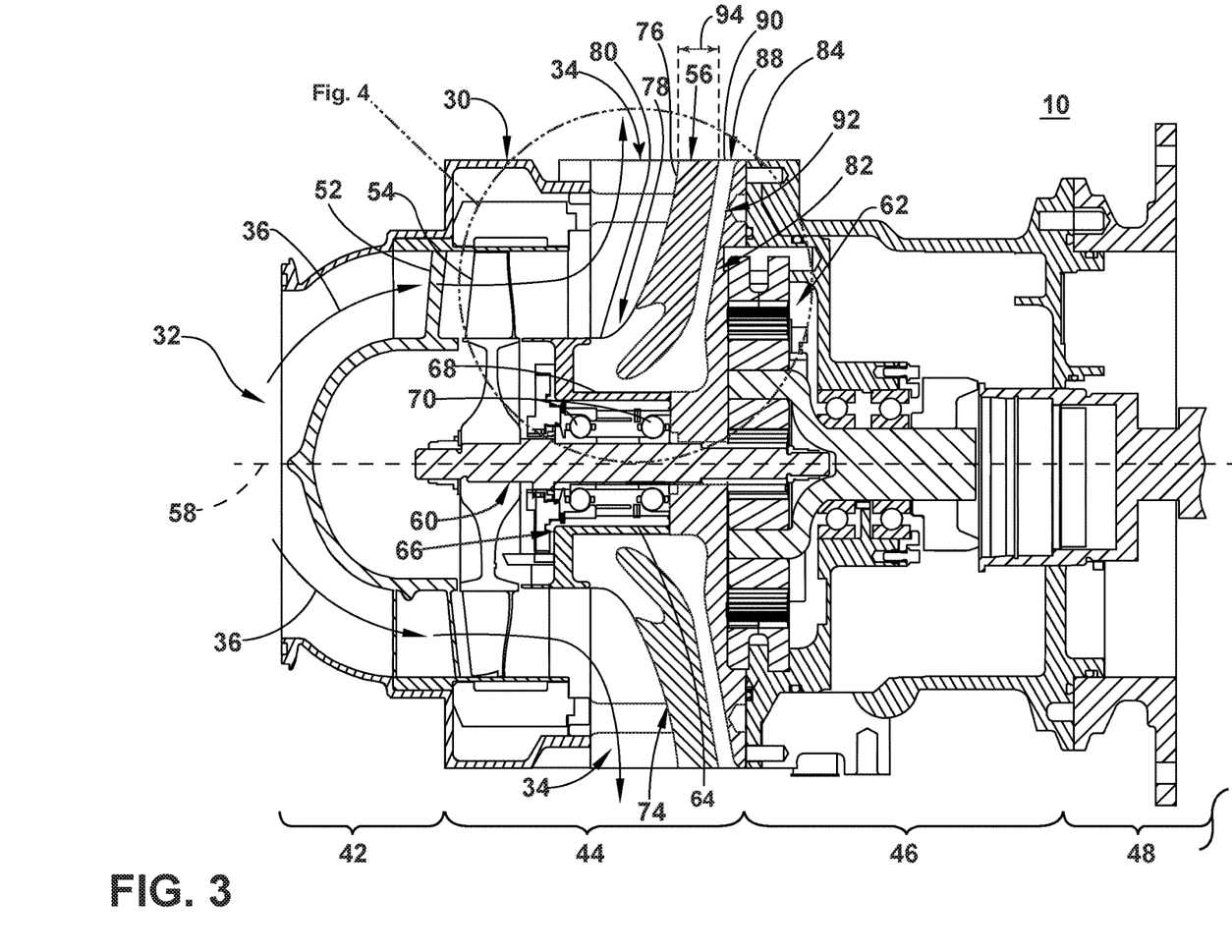
FIG. 3 is a schematic cross-sectional view of a portion of the air starter of FIG. 2 along the line III-III.

FIG. 3 is a schematic cross section of the air starter 10 of FIG. 2 along the sectional line III-III further illustrating the inlet assembly 42, the turbine section 44, and the gear box 46 in greater detail. The inlet assembly 42 can include stationary portions 52 to guide air in the primary air flow path 36 and define at least a portion of a primary air flow path 36 from the primary inlet 32 to the turbine section 44. In one non-limiting example fluid or air is supplied to the primary air flow path 36 from either a ground-operating air cart, an auxiliary power unit, or a cross-bleed start from an engine already operating.

The turbine section 44 of the air starter 10 can include, but is not limited to, a turbine 54, a retention member 56, and the primary outlet 34. The turbine 54 can rotate about a centerline 58 of the air starter 10. Alternatively, the turbine 54 can rotate about any axis relative to the air starter 10. A drive shaft or output shaft 60 couples to the turbine 54 allowing for the transfer of energy from air in the primary air flow path 36 to mechanical power. The output shaft 60 can extend through at least a portion of the inlet assembly 42, the turbine section 44, or the gear box 46. By way of non-limiting example, the output shaft 60 can couple the turbine 54 to one or more gears or clutch assemblies such as a gear train 62 in the gear box 46.

The retention member 56 located in the interior 28 of the housing 30 circumscribes at least a portion of the output shaft 60. The retention member 56 can include or define a receiving portion or pocket 64. A bearing assembly 66 can be received in the pocket 64, located radially between at least a portion of the retention member 56 and the output shaft 60. The bearing assembly 66 rotationally supports the output shaft 60. The bearing assembly 66 can include at least a bearing housing 68 and at least one bearing 70. As illustrated by way of non-limiting example, the bearing housing 68 includes two axially spaced bearings 70. The bearings 70 can be circumscribed by the bearing housing 68, retained by the retention member 56, and mounted to the output shaft 60.

An upstream axial face 74 of the retention member 56 can define at least a part of the primary air flow path 36 that directs air from the primary inlet 32 or the inlet assembly 42 to the primary outlet 34. By way of non-limiting example, at least a portion of the axial face 74 of the retention member 56 is a deflector 76 axially aligned with the circumferentially arranged openings of the primary outlet 34.

The axial face 74 of the retention member 56 can include at least one opening 78 that defines at least one cooling inlet 80. It is contemplated that more than one opening 78 or cooling inlet 80 can be located circumferentially in the axial face 74 retention member 56 about the output shaft 60. The cooling inlet 80 allows for a portion of air from the primary air flow path 36 to enter a cooling passage 82 at least partially housed within the retention member 56. A peripheral edge 84 of the retention member 56 includes at least one opening 88 that defines at least one cooling outlet 90. A cooling air flow path 92 can be defined by the cooling inlet 80, the cooling passage 82, and the cooling outlet 90. The cooling outlet 90 can be at an axial location downstream of the primary outlet 34. That is, the cooling outlet 90 is separate from the primary outlet 34 and can have, by way of non-limiting example, an axial distance 94 between the cooling outlet 90 and the primary outlet 34.

Figure 4:
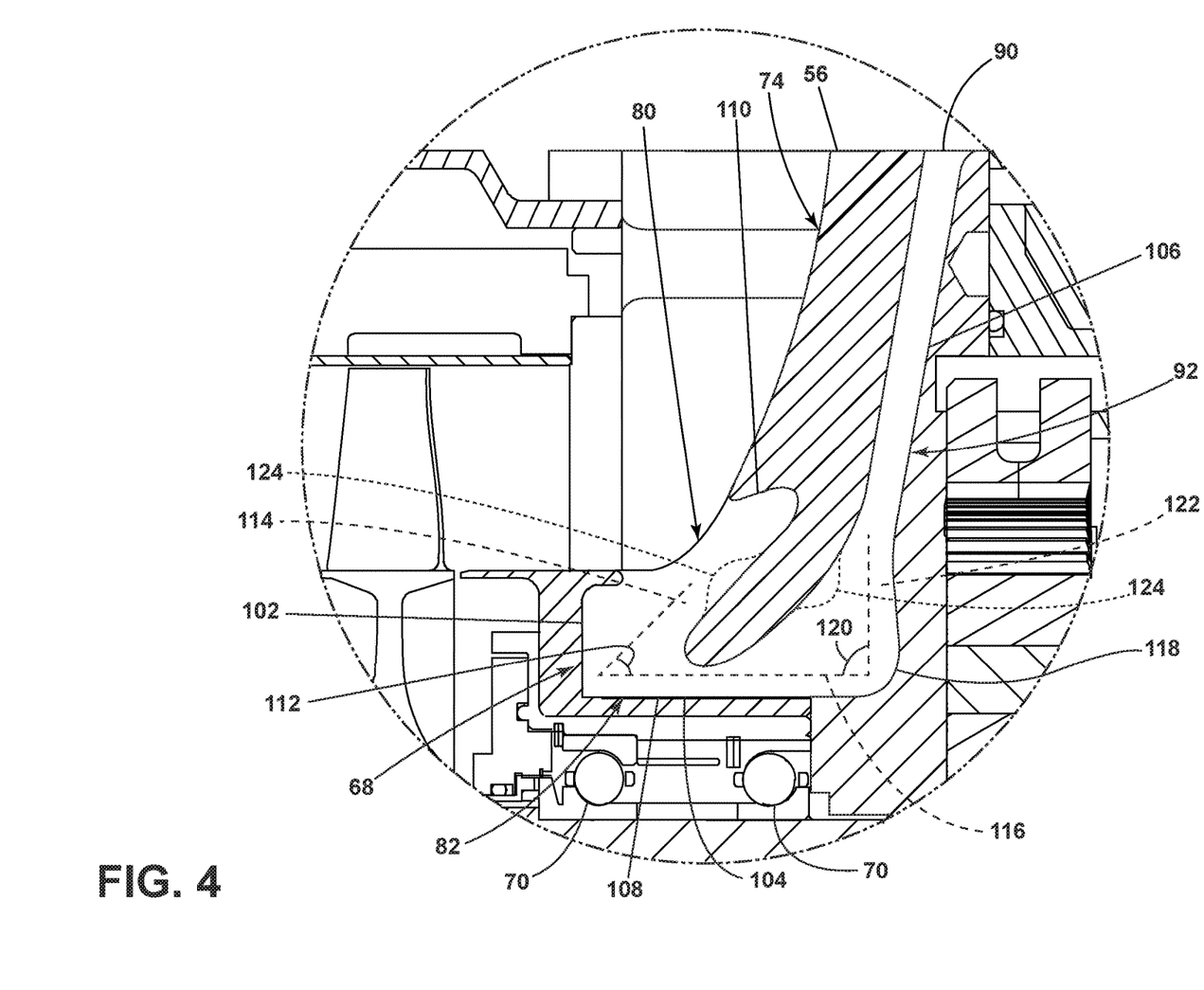
FIG. 4 is an enlarged schematic cross-sectional view of a portion of a retention member of the air starter of FIG. 3.

FIG. 4 further illustrates the cooling air flow path 92 that extends from the least one cooling inlet 80 defined by the axial face 74 to the at least one cooling outlet 90 via the cooling passage 82. By way of non-limiting example, the cooling passage 82 can be a labyrinth passage 100 in the retention member 56 that includes a first, second, and third portion 102, 104, 106. It is contemplated that the cooling passage 82 can include at least one turn.

The first portion 102 can extend from the cooling inlet 80 to a lower portion 108 portion of the bearing housing 68 that is proximate the bearings 70. It is contemplated that the cooling passage 82 or labyrinth passage 100 can include an extended corner or cavity. As illustrated in a non-limiting example, a first extended corner or first cavity 110 can be located in the first portion 102 of the cooling passage 82 or labyrinth passage 100. It is contemplated that at least part of the first portion 102 can be linear or curvilinear.

The second portion 104 of the cooling passage 82 or labyrinth passage 100 extends generally parallel to the lower portion 108 bearing housing 68. It is contemplated that a first turn can be defined by at least part of the first and second portions 102, 104. The first turn can include a first angle 112 measured between the first and second portions 102, 104 can be between or include 0 degrees to 180 degrees. The first angle 112 can be measured from a first centerline 114 of the first portion 102 to a second centerline 116 of the second portion 104.

Downstream of the axial face 74 of the retention member 56, the bearing housing 68 can define at least a portion of the cooling passage 82 or labyrinth passage 100. Heat from the bearing housing 68 can be transferred to air in the cooling air flow path 92. As illustrated by way of non-limiting example, the second portion 104 can include an impingement zone, extended corner, or cavity illustrated as a second cavity 118 It is contemplated that at least part of the second portion 104 can be linear or curvilinear.

The third portion 106 can extend from the bearing housing 68 to the cooling outlet 90. At least part of the third portion 106 can be linear or curvilinear. It is contemplated that a second turn can be defined by at least part of the second and third portions 104, 106. The second turn can include a second angle 120 between the second centerline 116 of the second portion 104 and a third centerline 122 of the third portion 106 can be 90 degrees. It is further contemplated that the second angle 120 can be between or include 0 degrees to 180 degrees. The third portion 106 can be proximal to a portion of the gear box 46 that contains cooling or lubricating fluids such as oil.

Optionally, at least one surface geometry 124 can be located along portion of the cooling air flow path 92 or labyrinth passage 100. The surface geometry 124 is illustrated in dotted lines and can include, in any combination or singularity, forward facing steps, pins, turbulators, aft facing steps, bumps, ridges, or dimples. The inclusion of the surface geometry 124 in the cooling air flow path 92 can decrease or increase the radius of one or more portions of the cooling passage 82 or labyrinth passage 100. It is contemplated that one or more surface geometries 124 can be located in one or more of the first, second, or third portions 102, 104, and 106 of the cooling passage 82 or labyrinth passage 100. It is further contemplated that the one or more surface geometries 124 can also be used to change the velocity of at least a portion of the fluid or air in order to obtain a desired speed, direction, or momentum.

While illustrated as exhausting outside of the air starter 10, it is contemplated that the cooling outlet 90 can deliver air from the cooling passage 82 to any location interior or exterior of the air starter 10. It is further contemplated that air for the purpose of cooling can be supplied to the cooling inlet 80 of the cooling air flow path 92 from any location interior or exterior of the air starter 10.

Figure 5:
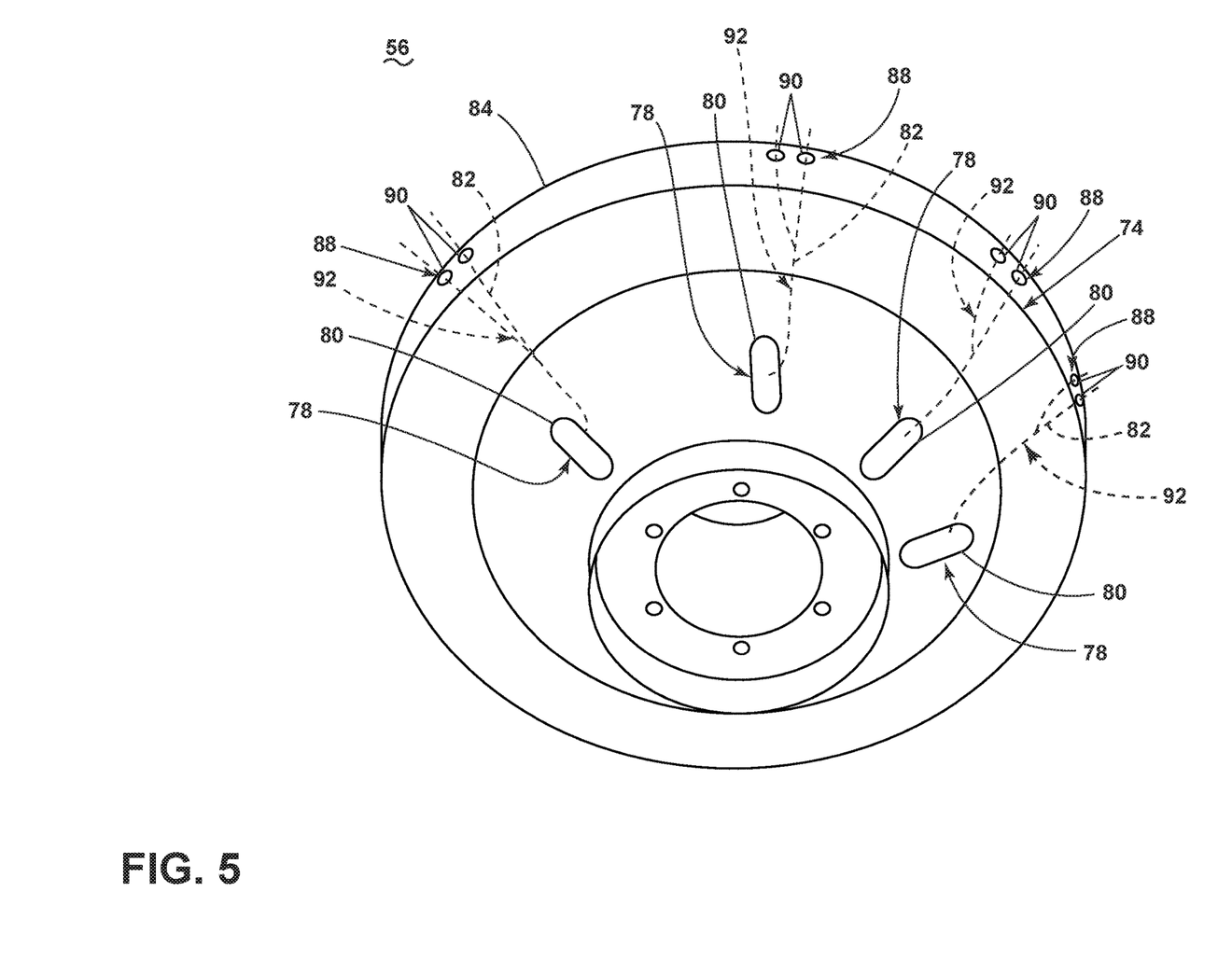
FIG. 5 is a schematic illustration a retaining member of the air starter of FIG. 2.

FIG. 5 provides a perspective view of the retention member 56. The axial face 74 of the retention member 56 illustrates the at least one opening 78 as multiple openings. The multiple openings can define multiple cooling inlets 80. While each cooling air flow path 92 is illustrated as having one cooling inlet 80, it is contemplated that any number of cooling inlets 80 can couple to each cooling passage 82 of the cooling air flow path 92.

The peripheral edge 84 of the retention member 56 illustrates the at least one opening 88 as multiple openings. The multiple openings can define multiple cooling outlets 80. While each cooling passage 82 is illustrated as having two cooling outlets 90, it is contemplated that a plurality of openings can define any number of cooling outlets 90 for each cooling air flow path 92.

While illustrated, by way of non-limiting example as an oval, the cooling inlets 80 can be any shape or inclination. Similarly, the cooling outlets 90 are illustrated as circular. It is contemplated that the shape of the cooling outlet 90 can be any known shape.

Aspects of the present disclosure can be used in a method of cooling the bearing assembly 66 in the air started 10 that includes the primary air flow path 36 that flows over the turbine 54 rotationally supported by the bearing assembly 66. The method can include cooling the bearing assembly 66 by diverting a portion of air from the primary air flow path 36 to flow over the bearing assembly 66. The diverted portion of air is emitted from the air starter 10 at the cooling outlet 90 separate from the primary outlet 34.

In operation, a fluid, for example air, is supplied to the air starter 10. The air enters the primary air flow path 36 through the primary inlet 32. The energy from the air is transformed to mechanical energy by the turbine 54 which rotates in response to the air flow through the turbine 54. The turbine 54 is coupled to the output shaft 60, such that the rotational energy from the turbine 54 can be transferred to the gear box 46 via the output shaft 60. The at least one bearing 70 housed in the bearing housing 68 rotatably supports the output shaft 60. The bearing housing 68 can be formed in or supported by the retention member 56.

Once past the turbine 54, the air is cooler and less compressed. The air from the turbine 54 continues through the primary air flow path towards the primary output 34. The retention member 56 forms at least a part of the primary air flow path. The axial face 74 of the retention member 56 includes the at least one cooling inlet 80 and the deflector 76. The deflector 76 directs a portion of the air flow in the primary air flow path 36 to the primary outlet 34.

The cooling inlet 80 allows the retention member 56 to bleed or divert a portion of the air from the primary air flow path 36 through the cooling air flow path 92. The air enters the cooling air flow path 92 via the cooling inlet 80 and continues through the cooling passage 82 or labyrinth passage 100. At least a portion of the cooling passage 82 or labyrinth passage 100 is the proximate the bearing housing 68 to cool the at least one bearing 70. It is also contemplated that the bearing housing 68 forms a portion of the cooling passage 82 or labyrinth passage 100. Heat from the bearings 70 can be transferred to the bearing housing 68 and to the air in the cooling passage 82 or labyrinth passage 100. That is, a portion of the air in the primary air flow path 36 passes through the cooling passage 82 and cools the bearing 70.

Optionally, the air flow through the cooling passage 82 or labyrinth passage 100 can be directed to a portion of the cooling passage 82 or labyrinth passage 100 adjacent to or proximal to the gear box 46. The air in the cooling passage 82 or labyrinth passage 100 can absorb heat from portions of the gear box 46. The gear box portions 46 can include cooling or lubricating fluids such as, but not limited to, oil.

Benefits associated with aspects of the disclosure herein include cooling of the bearings. The temperature of the bearings is often one of the limiting factors in determining the length of time the air starter can operate before requiring cool down time. Aspects of the present invention reduce the temperature of the bearings during motoring, which increases the amount of time the air starter can operate. Longer operation of the air starter allows for multiple attempts at firing the turbine engine from the air starter before requiring a cool down period for the air starter.

Additional benefits include a longer part life due to increased cooling of the parts. Aspects of the present invention provide a reduced thermal load on the air starter.

Yet another benefit of the present disclosure is a reduction in lubricant or oil temperatures while the starter is in operation. Reduced lubricant or oil temperatures can further improve the part life as well as the life of the lubricant or oil.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An air starter including a housing defining an interior having a primary inlet and a primary outlet to define a primary air flow path from the primary inlet to the primary outlet, a turbine located within the interior, an output shaft coupled to the turbine, at least one bearing located in the housing and rotationally supporting the output shaft, and a cooling passage adjacent the at least one bearing and having a cooling inlet and a cooling outlet, to define cooling air flow path from the cooling inlet to the cooling outlet, with the cooling inlet fluidly coupled to the primary air flow path whereby a portion of air in the primary air flow path passes through the cooling passage and cools the bearing.

2. The air starter of any preceding clause further comprising a bearing housing containing the at least one bearing and the cooling passage is proximate the bearing housing.

3. The air starter of any preceding clause wherein the bearing housing forms part of the cooling passage.

4. The air starter of any preceding clause further comprising a retention member mounted to the output shaft to retain the turbine or the at least one bearing and the retention member comprises the bearing housing.

5. The air starter of any preceding clause wherein the retention member has an axial face comprising a multiple openings, which form the cooling inlet.

6. The air starter of any preceding clause wherein the retention member has a peripheral edge with multiple openings, which form the cooling outlet.

7. The air starter of any preceding clause wherein at least a portion of the cooling passage is formed in the retention member.

8. The air starter of any preceding clause wherein the portion of the cooling passage formed in the retention member is a labyrinth passage.

9. The air starter of any preceding clause wherein the labyrinth passage has at least one turn of at least 90 degrees.

10. The air starter of any preceding clause wherein the cooling outlet is separate from the primary outlet.

11. The air starter of any preceding clause wherein a portion of the retention member defines a portion of the primary air flow path.

12. The air starter of any preceding clause wherein the primary outlet comprises a plurality of circumferentially arranged openings in a peripheral wall of the housing and the portion of the retention member is a deflector axially aligned with the circumferentially arranged openings.

13. The air starter of any preceding clause wherein the at least one bearing comprises two spaced bearings.

14. The air starter of any proceeding clause wherein both of the two spaced bearings are mounted to the output shaft.

15. An air starter including a housing having a peripheral wall defining an interior, the housing having a primary inlet and a primary outlet to define a primary air flow path from the primary inlet to the primary outlet, with the primary outlet comprising a plurality of openings circumferentially arranged in the peripheral wall, a retention member located within the interior and mounted to the housing in axial alignment with the primary outlet, the retention member having an axial face forming a portion of the primary air flow path and having a bearing housing on a downstream side of the axial face, at least two axially-spaced bearings mounted within the bearing housing, an output shaft rotationally supported in the at least two axially-spaced bearings and having a portion upstream of the retention member, a turbine mounted to the portion of the output shaft upstream of the retention member, and a cooling passage extending through the retention member along the bearing housing and having a cooling inlet on the axial face of the retention member and a cooling outlet separate from the primary outlet.

16. The air starter of any preceding clause wherein the cooling passage is a labyrinth passage.

17. The air starter of any preceding clause wherein the labyrinth passage has at least one turn of at least 90 degrees.

18. The air starter of any preceding clause wherein the cooling passage comprises multiple circumferentially spaced cooling passages having inlets on the axial face and outlets on a peripheral edge of the retention member.

19. A method of cooling a bearing assembly in an air starter having a primary air flow path flowing over a turbine rotationally supported by a bearing assembly, the method comprising diverting a portion of air from the primary air flow path to flow over the bearing assembly.

20. The method of any preceding clause wherein the diverted portion of air is emitted from the air starter at a cooling outlet separate from a primary outlet.

What is claimed is:

1. An air starter comprising:
a housing defining, in an axial series arrangement, an inlet assembly, a turbine section and a drive section, the housing having an interior with a primary inlet located at the inlet assembly and a primary outlet located at the turbine section to define a primary air flow path from the primary inlet to the primary outlet;

a turbine located in the turbine section within the interior;

an output shaft coupled to the turbine;

at least one bearing located in the housing and rotationally supporting the output shaft; and a cooling passage located in the turbine section, adjacent the at least one bearing, and having a cooling inlet and a cooling outlet, to define a cooling air flow path from the cooling inlet to the cooling outlet, with the cooling inlet fluidly coupled to the primary air flow path whereby a portion of air in the primary air flow path passes through the cooling passage and cools the at least one bearing.

2. The air starter of claim 1 further comprising a bearing housing containing the at least one bearing and the cooling passage is proximate the bearing housing.

3. The air starter of claim 2 wherein the bearing housing forms part of the cooling passage.

4. The air starter of claim 3 further comprising a retention member mounted to the output shaft to retain the turbine or the at least one bearing and the retention member comprises the bearing housing.

5. The air starter of claim 4 wherein the retention member has an axial face comprising multiple inlet openings which form the cooling inlet.

6. The air starter of claim 5 wherein the retention member has a peripheral edge with multiple outlet openings which form the cooling outlet.

7. The air starter of claim 6 wherein at least a portion of the cooling passage is formed in the retention member.

8. The air starter of claim 7 wherein the portion of the cooling passage formed in the retention member is a labyrinth passage.

9. The air starter of claim 8 wherein the labyrinth passage has at least one turn of at least 90 degrees.

10. The air starter of claim 4 wherein the cooling outlet is separate from the primary outlet.

11. The air starter of claim 10 wherein a portion of the retention member defines a portion of the primary air flow path.

12. The air starter of claim 11 wherein the primary outlet comprises a plurality of circumferentially arranged openings in a peripheral wall of the housing and the portion of the retention member is a deflector axially aligned with the plurality of circumferentially arranged openings.

13. The air starter of claim 1 wherein the at least one bearing comprises two spaced bearings.

14. The air starter of claim 13 wherein both of the two spaced bearings are mounted to the output shaft.

15. The air starter of claim 1 wherein the cooling passage includes at least a first portion and a second portion, wherein a first turn is measured at an intersection of the first portion and second portion.

16. An air starter comprising:
a housing having a peripheral wall defining an interior, the housing having a primary inlet and a primary outlet to define a primary air flow path from the primary inlet to the primary outlet, with the primary outlet comprising a plurality of openings circumferentially arranged in the peripheral wall;

a retention member located within the interior and mounted to the housing in axial alignment with the primary outlet, the retention member having an axial face forming a portion of the primary air flow path;

a bearing housing defined by or received by a portion of the retention member;

at least two axially-spaced bearings mounted within the bearing housing;

an output shaft rotationally supported in the at least two axially-spaced bearings and having a portion upstream of the retention member;

a turbine mounted to the portion of the output shaft upstream of the retention member; and a cooling passage extending through the retention member along the bearing housing and having a cooling inlet on the axial face of the retention member and a cooling outlet separate from the primary outlet.

17. The air starter of claim 16 wherein the cooling passage is a labyrinth passage.

18. The air starter of claim 17 wherein the labyrinth passage has at least one turn of at least 90 degrees.

19. The air starter of claim 17 wherein the cooling passage comprises multiple circumferentially spaced cooling passages having inlets on the axial face and outlets on a peripheral edge of the retention member.

20. An air starter comprising:
a housing defining an interior having a primary inlet and a primary outlet to define a primary air flow path from the primary inlet to the primary outlet, wherein the primary outlet comprises a plurality of circumferentially arranged openings in a peripheral wall of the housing;

a turbine located within the interior;

an output shaft coupled to the turbine;

at least one bearing located in the housing and rotationally supporting the output shaft;

a retention member coupled to the output shaft to retain the turbine or the at least one bearing, wherein a portion of the retention member is a deflector axially aligned with the plurality of circumferentially arranged openings of the primary outlet; and a cooling passage defined, at least in part, by the retention member, the cooling passage having a cooling inlet and a cooling outlet to define a cooling air flow path from the cooling inlet to the cooling outlet, with the cooling inlet fluidly coupled to the primary air flow path whereby a portion of air in the primary air flow path passes through the cooling passage and cools the at least one bearing.

* * * * *